Sept. 10, 1929.  H. FORD  1,727,874
METHOD OF FORMING BRAKE SHOES
Filed Oct. 5, 1927
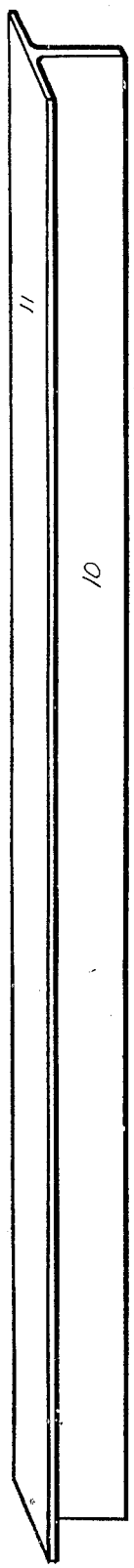
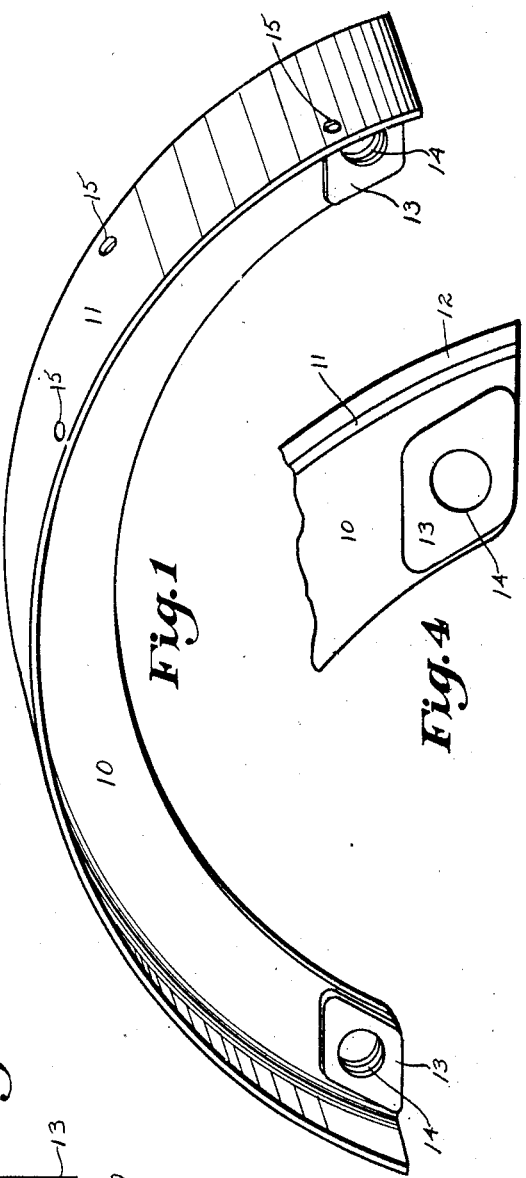
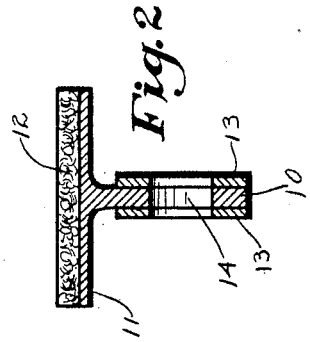
INVENTOR.
Henry Ford.
BY C. R. Halbert.
E. L. Davis.
ATTORNEYS.

Patented Sept. 10, 1929.

1,727,874

UNITED STATES PATENT OFFICE.

HENRY FORD, OF DEARBORN, MICHIGAN.

METHOD OF FORMING BRAKE SHOES.

Application filed October 5, 1927. Serial No. 224,094.

The object of my invention is to provide a method of forming brake shoes of simple, durable and inexpensive construction.

Still a further object of my invention is to provide a method of forming a brake shoe which may be especially adapted for an automobile and which lends itself readily to service and production.

Still a further object of my invention is to provide a method of forming a brake shoe having a T cross section and which may be so formed that all the shoes in connection with a given vehicle may be interchangeable, and so that the parts will be properly built to withstand the stresses thereon.

Still a further object of my invention is to provide a method of forming a brake shoe of T cross section which consists of cutting a strip of T metal to the proper length and then bowing it to form a brake shoe, then reinforcing the ends of the vertical web of the brake shoe, by welding washers thereto at either side thereof whereby an opening may be made through said web and the washers for the attachment of the brake to the remainder of the brake mechanism and the point of attachment may be strong enough to withstand the stresses which may be placed thereon.

With these and other objects in view my invention consists in the arrangement, combination, and construction of the various operations of my improved method, as described in the specification, claimed in the claims and illustrated in the accompanying drawings, in which:

Figure 1 shows a perspective view of a brake shoe formed in accordance with my invention and before the brake lining has been attached thereto.

Figure 2 shows a transverse sectional view of the brake shoe near one end thereof to illustrate the manner of reinforcing the vertical web of the brake shoe.

Figure 3 shows a perspective view of the blank of which the brake shoe is formed, and Figure 4 shows an enlarged elevation of one end of the brake shoe illustrating the manner of its reinforcement.

Referring to the accompanying drawings I have used the reference numeral 10 to indicate the reinforcing web of a brake shoe of T cross section, having the transverse or lining carrying web 11. A lining 12 is secured to this web in any suitable manner.

This brake shoe is formed by having strip stock rolled to T cross section to form long strips which may be cut off into appropriate lengths to form blanks such as is illustrated at Figure 3. This blank so formed is rolled to or otherwise formed to bow or arc shape. This bowing or arcing of the blank may be accomplished in any of a number of ways, as either cold or hot by rolling or swedging.

When the blank has been so shaped, then the ends are trimmed off at an angle as is illustrated in Figure 4, and a pair of reinforcing washers 13 of diamond shape are secured to the surface of the reinforcing web 10 at either side thereof and at either end thereof in the place illustrated in the drawings. These washers are preferably secured in place by a weld, so that their entire structure may be integrally united with the structure of the reinforcing webs.

The openings 14 are then formed in the center of the washers 13 to receive the brake pins or other means for mounting the brake shoe on the rest of the brake mechanism.

A plurality of rivet holes 15 are then formed in the web 11 whereby the lining 12 may if desired be secured thereto by rivets.

Among the many advantages arising from the use of my improved brake, it should first be pointed out that the construction of the brake shoe is very simple, the manufacture thereof requires a relatively small number of operations and still the completed shoe has the requisite strength for the purposes intended. The shoes may be readily made so that all the shoes in connection with a given vehicle will be interchangeable. The weight of the shoe is very small in comparison with its strength. The cost thereof is also relatively slight.

In this connection it should be pointed out that large numbers of attempts have been made to make a satisfactory brake shoe for an automobile which would have the necessary factors of strength, simplicity, light weight, and low cost of manufacture. These attempts have been mostly confined to casting brake shoes from metals lighter than iron or to forming the brake shoes from sheet metal. For instance, such brake shoes have been formed from two or more pieces of sheet metal bent to angle or T shape and then riveted or otherwise secured together. With my improved brake shoe however, the brake shoe is an integral piece of metal when it is completed and it may be made from standard stock as the T section stock for the shoe and the sheet metal for the washers 13 are all standard materials.

Some changes may be made in the arrangement, construction, and combination of the various parts of my improved device without departing from the spirit of my invention and it is my intention to cover by my claims, such changes as may reasonably be included within the scope thereof.

I claim as my invention:

1. The method of forming brake shoes, consisting of first preparing a blank consisting of a section of straight rolled stock of T cross section, then shaping the blank to arcuate form so as to provide a transverse lining carrying web and the reinforcing web perpendicular thereto, then trimming the ends of said blank, then welding reinforcing members to the reinforcing web on either side thereof and at either end thereof, and then perforating the reinforced portions to receive the brake operating mechanism.

2. The method of forming brake shoes consisting of first cutting lengths of rolled strip stock of T cross section to predetermined length to form blanks, then forming the blanks to arcuate form whereby they may have a transverse lining carrying web and a reinforcing web perpendicular thereto, then trimming the ends of said blanks to cause said ends to be identical with each other, then welding reinforcing members to either side of the reinforcing web near either end thereof, and then perforating these reinforced portions to receive brake operating mechanism, the parts being so arranged that the shoes are identical at each end and thereby reversible.

HENRY FORD.